(12) United States Patent
Kida et al.

(10) Patent No.: US 10,061,146 B2
(45) Date of Patent: Aug. 28, 2018

(54) DISPLAY DEVICE

(71) Applicant: Alpine Electronics, Inc., Tokyo (JP)

(72) Inventors: Shinobu Kida, Fukushima (JP); Kenji Matsumoto, Fukushima (JP); Takashi Nitsuma, Fukushima (JP)

(73) Assignee: Alpine Electronics, Inc., Tokyo (JP)

( * ) Notice: Subject to any disclaimer, the term of this patent is extended or adjusted under 35 U.S.C. 154(b) by 68 days.

(21) Appl. No.: 14/952,457

(22) Filed: Nov. 25, 2015

(65) Prior Publication Data

US 2016/0187711 A1 Jun. 30, 2016

(30) Foreign Application Priority Data

Dec. 25, 2014 (JP) ................................ 2014-263366

(51) Int. Cl.
*G02F 1/1333* (2006.01)

(52) U.S. Cl.
CPC .... *G02F 1/133308* (2013.01); *G02F 1/13338* (2013.01); *G02F 2001/13332* (2013.01); *G02F 2001/133314* (2013.01); *G02F 2001/133331* (2013.01)

(58) Field of Classification Search
CPC ... G02F 1/133308; G02F 2001/133314; G02F 2001/133317; G02F 2001/13332; G02F 2001/133322; G02F 2001/133325; G02F 2001/133328
See application file for complete search history.

(56) References Cited

U.S. PATENT DOCUMENTS

| | | | |
|---|---|---|---|
| 6,424,391 | B1 | 7/2002 | Tsukamoto et al. |
| 2004/0119907 | A1* | 6/2004 | Ahn .................. G02F 1/133308 349/58 |
| 2008/0273139 | A1 | 11/2008 | Sugawara et al. |
| 2013/0107143 | A1 | 5/2013 | Dighde et al. |
| 2013/0194512 | A1 | 8/2013 | Nishimoto et al. |
| 2015/0022753 | A1* | 1/2015 | Akatsuka .......... G02F 1/133308 349/58 |

FOREIGN PATENT DOCUMENTS

| | | |
|---|---|---|
| JP | 2001-013887 A | 1/2001 |
| JP | 2004-206095 A | 7/2004 |
| JP | 2004-309663 A | 11/2004 |
| JP | 2008-276066 A | 11/2008 |
| JP | 2009-122398 | 6/2009 |

(Continued)

OTHER PUBLICATIONS

European Search Report and Annex for the corresponding EP Patent Application No. 15198601, dated May 18, 2016, (8 pgs.).

(Continued)

*Primary Examiner* — Phu Vu
(74) *Attorney, Agent, or Firm* — Brinks Gilson & Lione (57) ABSTRACT

A front panel, a touchpad, and a display cell are adhered and fixed, and these and a back light are held by a bracket to construct a display body unit. When the display body unit is mounted on a support, the front panel is fixed to the support with an adhesive layer therebetween. In this state, each of mounting portions has position adjustability in the vertical direction (Z direction). In the state having position adjustability, the mounting portion is fixed to the support by a fixing mechanism.

7 Claims, 6 Drawing Sheets

(56) References Cited

FOREIGN PATENT DOCUMENTS

| | | | |
|---|---|---|---|
| JP | 2009-122398 | A | 6/2009 |
| JP | 2011-070053 | A | 4/2011 |
| JP | 2013-156346 | A | 8/2013 |
| JP | 2013156346 | A | 8/2013 |
| JP | 2014-098726 | A | 5/2014 |
| JP | 2014-149418 | A | 8/2014 |
| JP | 2014-532897 | A | 12/2014 |
| WO | 2014-051924 | A1 | 4/2014 |
| WO | 2014051924 | A1 | 4/2014 |

OTHER PUBLICATIONS

Japanese Office Action dated Jun. 5, 2018 from the corresponding Japanese Application No. 2014-263366, with English translation, 8 pages.

* cited by examiner

FIG. 6

DISPLAY DEVICE

RELATED APPLICATIONS

The present application claims priority to Japanese Patent Application Serial Number 2014-263366, filed Dec. 25, 2014, the entirety of which is hereby incorporated by reference.

BACKGROUND OF THE INVENTION

1. Field of the Invention

The present disclosure relates to a display device having a structure capable of decreasing bending stress acting on a display cell and that is less likely to generate display unevenness.

2. Description of the Related Art

An on-vehicle display device includes a support for incorporating the display device in a dashboard or an instrument panel in a cabin. The support is formed with a display window, and a light-transmissive front panel is mounted on the display window. A display cell such as a liquid crystal cell is provided on an innder side of the front panel. In a display device of this type, when a large fixing force acts on the display cell upon fixation of the display cell to the support, the display cell is strained, thereby generating display unevenness, which is a problem. Recently, an in-plane switching (IPS) system liquid crystal cell has been used to secure a wide viewing angle. The liquid crystal cell, however, is likely to generate black unevenness (luminance unevenness) when bending stress or torsional stress acts thereon.

JP 2013-156346 A discloses a display device having a structure that reduces generation of luminance unevenness in an electro-optical panel.

In the display device, a peripheral portion of a rear surface of the electro-optical panel is fixed through a fixing layer, that is adhesive and elastic, to an inner frame formed by die-cast molding using aluminum alloy. A pedestal holding a back light is fixed to a lower frame. The lower frame is positioned inside the inner frame. An outer frame is positioned outside the inner frame, a spacer positioned to penetrate the inner frame lies between the lower frame and the outer frame in such a manner that the lower frame and the outer frame sandwich the inner frame, and the lower frame and the outer frame are fixed by a screw.

In the display device disclosed in JP 2013-156346 A, an electro-optical panel is supported by the inner frame, and the lower frame and the outer frame positioned to sandwich the inner frame are fixed by a screw so that strain due to the screwing is less likely to be transmitted to the inner frame and the electro-optical panel is not largely strained.

SUMMARY OF THE INVENTION

In the display device disclosed in JP 2013-156346 A, the electro-optical panel is fixed to the die-cast inner frame, and the pedestal supporting the back light is fixed to the lower frame so that a force applied to screw the lower frame is less likely to act on the liquid crystal display panel.

Assembling this structure is complicated because the number of components for fixing the electro-optical panel and the back light becomes large due to the fixation of the electro-optical panel and the back light to the different frames.

In addition, in the invention disclosed in JP 2013-156346 A, it is unclear in which structure the front panel and the touchpad are supported, while a front panel and a touchpad are typically positioned in front of an electro-optical panel. If a mechanism to fix the front panel and the touchpad is added to the structure of JP 2013-156346 A, the structure is more complicated and the number of components increases.

To address the above problem, the present disclosure provides a display device employing a structure having a front panel and a display cell in close contact, allowing the whole system to be constituted of the minimum number of components, and allowing the display cell to be less strained.

An aspect of the present disclosure is a display device comprising a support, a display window formed in the support, a light-transmissive front panel mounted on the display window, and a display cell positioned at an inner side of the front panel, wherein The display cell is adhered and fixed to an inner surface of the front panel, and the front panel and the display cell are held by a bracket to form a display body unit.

The front panel is fixed to the support, the display body unit is mounted on the support, and the bracket is fixed to the support by a fixing mechanism in a state having position adjustability in a vertical direction perpendicular to a surface of the front panel when the front panel is fixed to the support.

The display device aspect of the present disclosure may be structured such that the display cell is adhered and fixed to an inner surface of the front panel with a touchpad therebetween. The display device may be structured such that a back light is held by the bracket.

In the display device aspect of the present disclosure, the bracket may be formed with a mounting portion extending in the vertical direction, the mounting portion may be fixed to the support, and the mounting portion may be elastically deformable in a direction along the surface of the front panel.

In the display device aspect of the present disclosure, in the fixing mechanism, a mounting hole may be formed in the mounting portion, and the mounting portion may be fixed to the support by a mounting screw having a diameter smaller than an inner diameter of the mounting hole.

Alternatively, in the fixing mechanism, the mounting portion may be formed with a mounting hole, and the mounting portion may be fixed to the support by a rivet having a diameter smaller than the mounting hole.

Alternatively, in the fixing mechanism, the mounting portion may be fixed to the support by adhesive.

According to forms of the present disclosure, the display cell is fixed to the front panel in close contact. Thus, an air space is not likely to lie between the front panel and the display cell, and light from outside can be prevented from being reflected by the surface of the display cell.

In addition, the front panel and the display cell are fixed, the front panel is fixed to the support, and the bracket for supporting the front panel is fixed to the support by the fixing mechanism having position adjustability in the vertical direction upon the assembling work. Therefore, bending strain or torsional strain is less likely to be generated in the front panel, whereby generation of display unevenness or luminance unevenness referred to as black unevenness in the display cell fixed to the front panel can be suppressed.

DETAILED DESCRIPTION OF THE DRAWINGS

Figure 1:
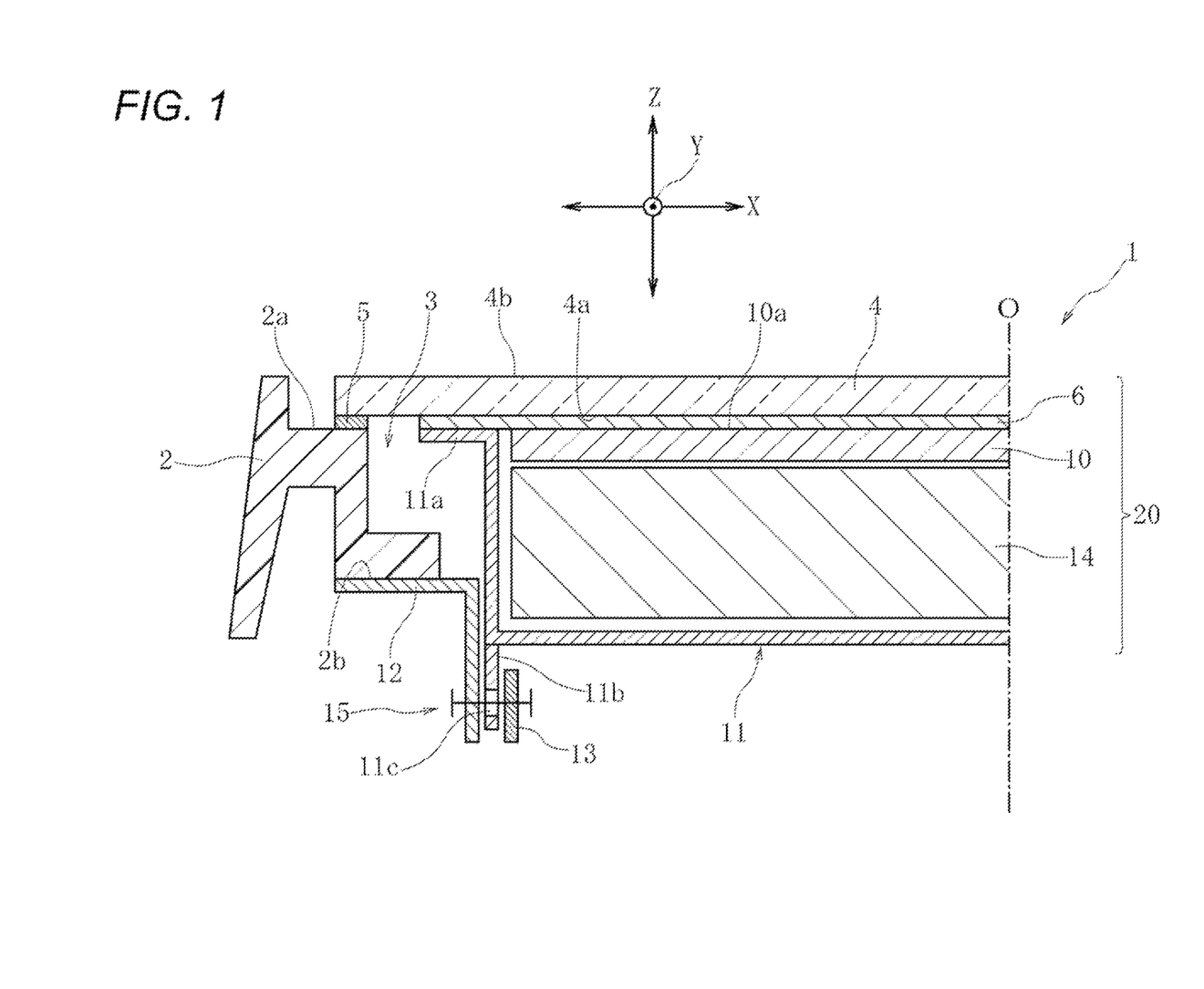
FIG. 1 is a cross sectional view illustrating a display device according to a first form of the present disclosure.

FIG. 1 is a cross sectional view illustrating a display device 1 according to a first form of the present disclosure. A display screen of the display device 1 is a rectangle having a long side along the X direction and a short side along the Y direction. In FIG. 1, only one side of a center line O dividing the display screen in two parts in the X direction is illustrated.

The display device 1 has a support 2. The support 2 is a decorative panel. For an on-vehicle display device, the support 2 is incorporated in a dashboard or an instrument panel installed in a cabin. Alternatively, the support 2 is mounted on a structure projecting from a dashboard.

In the support 2, a display window 3 is opened, and a front panel 4 is mounted on the display window 3. The front panel 4 is a light-transmissive plate and is formed from an acrylic synthetic resin plate or a glass plate. The front panel 4 is formed to have a rectangle shape to match the shape of the display screen. The support 2 is formed with a support surface 2a surrounding the whole periphery of the display window 3. Edge parts on the four sides of the front panel 4 are fixed to the support surface 2a through an adhesive layer 5. An inner surface 4a, which faces inward of the device, of the front panel 4 is fixed to the support surface 2a.

Note that, the support 2 may be formed with a support surface facing inward of the device, and an outer surface 4b, which faces the cabin, of the front panel 4 may be fixed to the support surface through the adhesive layer 5.

A touchpad 6 Is fixed to an inner surface of the front panel 4. The touchpad 6 includes a transparent electrode layer of, for example, indium tin oxide (ITO), formed on a surface of a light-transmissive film substrate or on a surface of a substrate on a light-transmissive sheet. The touchpad 6 is an electrostatic sensor configured to sense change of mutual capacitance of a first electrode and a second electrode. The first electrode and the second electrode are respectively provided in a plural. Alternatively, a plurality of electrodes may be provided, and the touchpad 6 may be an electrostatic sensor configured to sense change of self-capacitance of each of the electrodes. In the touchpad 6, when a finger of a person having substantially ground potential touches the outer surface 4b of the front panel 4, coordinate information regarding the position touched by the finger in the outer surface 4b can be obtained from the change of electrostatic capacitance of the touch position.

Instead of the touchpad 6 configured to sense change of electrostatic capacitance, a resistance change type coordinate sensor configured to sense a position touched by a finger from resistance change may be used, and the sensor may be located on the outer surface 4b of the front panel 4.

A display cell 10 is provided on an inner side of the front panel 4. The display cell 10 may be a liquid crystal cell or an electroluminescence (EL) cell. The display cell 10 of this embodiment is a color liquid crystal cell and is a liquid crystal display cell of an IPS system capable of securing a wide viewing angle. The display cell 10 is formed by providing a liquid crystal layer, an electrode layer, and a color filter between opposing transparent substrates, and further laminating a polarizing plate and the like. The electrode layer constitutes pixels.

A front surface 10a, which is the display side of the display cell 10, is adhered and fixed to the touchpad 6. The front panel 4 and the touchpad 6 are formed to allow full face adhesion through optically clear adhesive (OCA) and to allow an air space as little as possible in the adhered part. Similarly, the touchpad 6 and the display cell 10 are also formed to allow full face adhesion through OCA and to allow an air space as little as possible in the adhered part. When the touchpad 6 is not provided, the front panel 4 and the display cell 10 are directly adhered over the whole surface through OCA.

As illustrated in FIG. 1, the display device 1 is provided with a bracket 11. The bracket 11 is formed from a metal plate. The bracket 11 is fixed at least to the front panel 4, directly or indirectly. In the form illustrated in FIG. 1, the touchpad 6 is fixed to a support frame 11a of the bracket 11, but the bracket 11 may directly fix the front panel 4. For example, the bracket 11 may be formed with a supporting claw, and an edge part of the front panel 4 may be clamped and held by the supporting claw.

The bracket 11 has a cube shape with the front side open, and holds a back light 14 therein. The back light 14 includes a light-transmissive light guide plate such as an acrylic plate, a reflection member provided on the rear part of the light guide plate, and a light source such as an LED configured to enter light into the light guide plate. The back light 14 may be in close contact with the display cell 10 and may oppose the display cell 10 through a gap. The back light 14 is held inside the bracket 11 by, for example, being clamped by the supporting claw.

The bracket 11 is integrally formed with a plurality of mounting pieces 11b. Each of the mounting pieces 11b is a plate piece parallel to the Y-Z plane. A plate surface of the mounting piece 11b extends in parallel to the short side of the display cell 10 and perpendicularly to the display surface (Z direction). The mounting piece 11b is formed with a mounting hole 11c.

As illustrated in FIG. 1, a holding member 12 is fixed to a rear surface 2b of the support 2. The holding member 12 constitutes a part of the support 2, and the holding member 12 is a stationary plate formed from a metal plate. An opposing member 13 is provided to oppose the holding member 12. The mounting piece 11b is sandwiched between the holding member 12 and the opposing member 13 and fixed by a fixing mechanism 15.

Figure 2A:
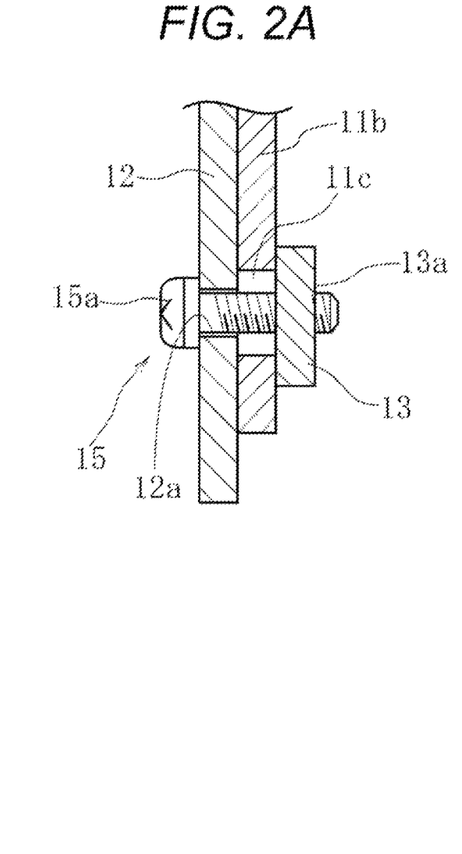
FIGS. 2A, 2B, and 2C are partial cross sectional views respectively illustrating fixing mechanisms having different structures.
Figure 2B:
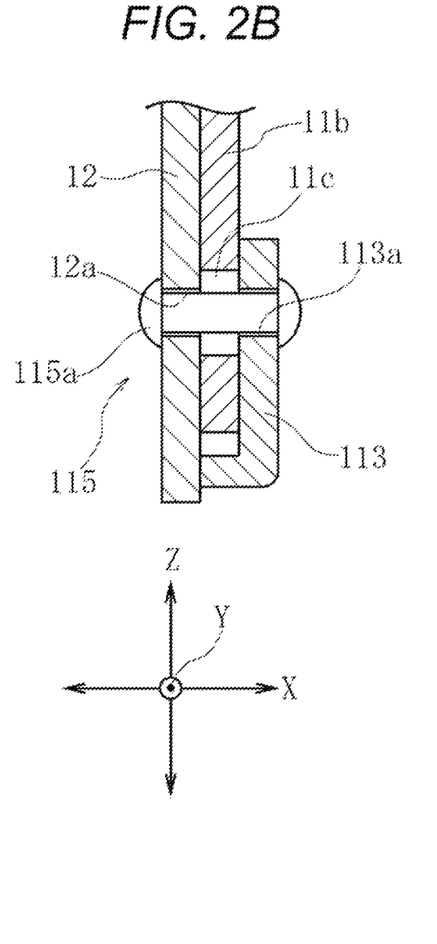
Figure 2C:
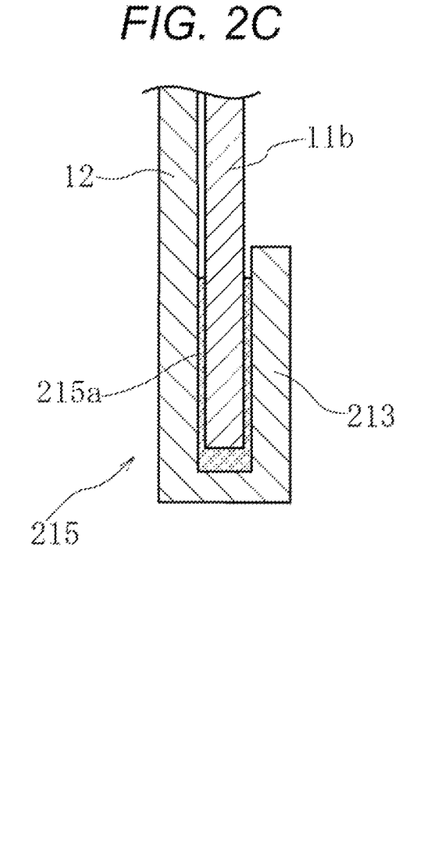

FIGS. 2A to 2C each illustrate the fixing mechanism 15 having a different structure. In the fixing mechanism 15 illustrated in FIG. 2A, the holding member 12 is formed with a through hole 12a, and the opposing member 13 is formed with a female screw hole 13a. A mounting screw 15a is inserted through the through hole 12a and the mounting hole 11c, and screwed into the female screw hole 13a in the opposing member 13. The opposing member 13 may include a nut member. The mounting hole 11c is formed in the mounting piece 11b to have an inner diameter sufficiently larger than the outer diameter of the shaft of the mounting screw 15a.

Next, assembly of the display device 1 according to the first form will be described.

(1) In the assembly of the display device 1, the touchpad 6 and the display cell 10 are adhered and fixed to the front panel 4 to form a laminate. The bracket 11 holding the laminate and the back light 14 is assembled as one display body unit 20.

(2) The holding member 12 is attached to the support 2 incorporated in the instrument panel or the like to form a stationary side unit.

(3) The display body unit 20 assembled in step (1) is mounted on the stationary side unit assembled in step (2) from the front side in the Z direction.

In step (3) of the assembly process, the inner surface 4a of the front panel 4 is first adhered and fixed to the support surface 2a of the support 2 by the adhesive layer 5. Since each of the mounting pieces 11b is not fixed at this time, the mounting piece 11b is not restricted with respect to the holding member 12 in the vertical direction (Z direction) and is flexible.

The mounting screw 15a is then inserted into the through hole 12a of the holding member 12 as illustrated in FIG. 2A, inserted into the mounting hole 11c of the mounting piece 11b, and screwed into the female screw hole 13a of the opposing member 13. Since the diameter of the shaft of the mounting screw 15a is sufficiently smaller than the inner diameter of the mounting hole 11c, the mounting piece 11b is not restricted in the vertical direction (Z direction). The mounting piece 11b having position adjustability in the Z direction is sandwiched between the holding member 12 and the opposing member 13 and fixed.

With this attaching structure, when the display body unit 20 is assembled to the support 2, large restricting force in the vertical direction (Z direction) does not act on each of the mounting pieces 11b. Even when the mounting piece 11b is fixed by the fixing mechanism 15, large attaching force does not act on the mounting piece 11b in the vertical direction (Z direction) or the Y direction since the inner diameter of the mounting hole 11c is sufficiently larger than the diameter of the shaft of the mounting screw 15a. Since each of the mounting pieces 11b does not cause a large force to act on the bracket 11 in the Z direction or the Y direction, stress straining a display surface such as bending stress and torsional stress due to variations of force acting on each of the mounting pieces 11b is less likely to act on the display cell 10.

The fastening of the mounting screw 15a may cause force to act on each of the mounting pieces 11b in the X direction. However, even when force in the X direction acts on the solid bracket 11, the force does not cause bending stress to directly act on the display cell 10. In addition, the mounting pieces 11b are elastically deformable in the X direction, which is the fastening direction of the screw, and thus the fastening force in the X direction is less likely to cause large bending stress or torsional stress to act on the display cell 10.

As described above, bending strain is less likely to generate black unevenness (luminance unevenness) or the like even when the display cell 10 is an IPS system liquid crystal display cell.

In addition, the display cell 10 is adhered and fixed to the touchpad 6 in close contact, or the display cell 10 is adhered to be in close contact with the front panel 4 and fixed. Thus, an air space is less likely to be formed between the display cell 10 and the front panel 4, whereby light from outside can be prevented from being reflected by the surface of the display cell 10. Therefore, an image displayed by the display cell 10 irradiated from the back by the back light 14 can be clearly viewed from the front of the front panel 4 with a wide viewing angle.

In the fixing mechanism 15, force acting on the bracket 11 in the vertical direction (Z direction) acts toward the surface of the mounting piece 11b. Thus, the bracket 11 has strength against force acting in the vertical direction. Therefore, even when the front panel 4 is pushed by a finger to operate the touchpad 6, the front panel 4 and the display cell 10 are firmly supported by the bracket 11 and thus the display cell 10 is less likely to be strained.

In a fixing mechanism 115 illustrated in FIG. 2B, one of the mounting pieces 11b lies between the holding member 12 and an opposing member 113. A rivet 115a is inserted into the through hole 12a of the holding member 12, the mounting hole 11c of the mounting piece 11b, and a through hole 113a of the opposing member 113, and then both ends of the rivet 115a are respectively caulked on the surfaces of the holding member 12 and the opposing member 113. Since the inner diameter of the mounting hole 11c is sufficiently larger than the diameter of the shaft of the rivet 115a, the mounting piece 11b having position adjustability in the vertical direction (Z direction) is fixed when the front panel 4 is fixed to the support 2.

Note that, in both of the fixing mechanism 15 illustrated in FIG. 2A and the fixing mechanism 115 illustrated in FIG. 2B, an elastic member such as rubber may lie between the holding member 12 and the mounting piece 11b, and between the mounting piece 11b and the opposing member 113.

In a fixing mechanism 215 illustrated in FIG. 2C, an opposing member 213 is formed by bending the holding member 12. An adhesive layer 215a lies between the holding member 12 and the opposing member 213, and the mounting pieces 11b are fixed by the adhesive layer 215a. Also in this structure, when the front panel 4 is fixed to the support 2, the mounting piece 11b in a state having position adjustability in the vertical direction (Z direction) is fixed.

Figure 3:
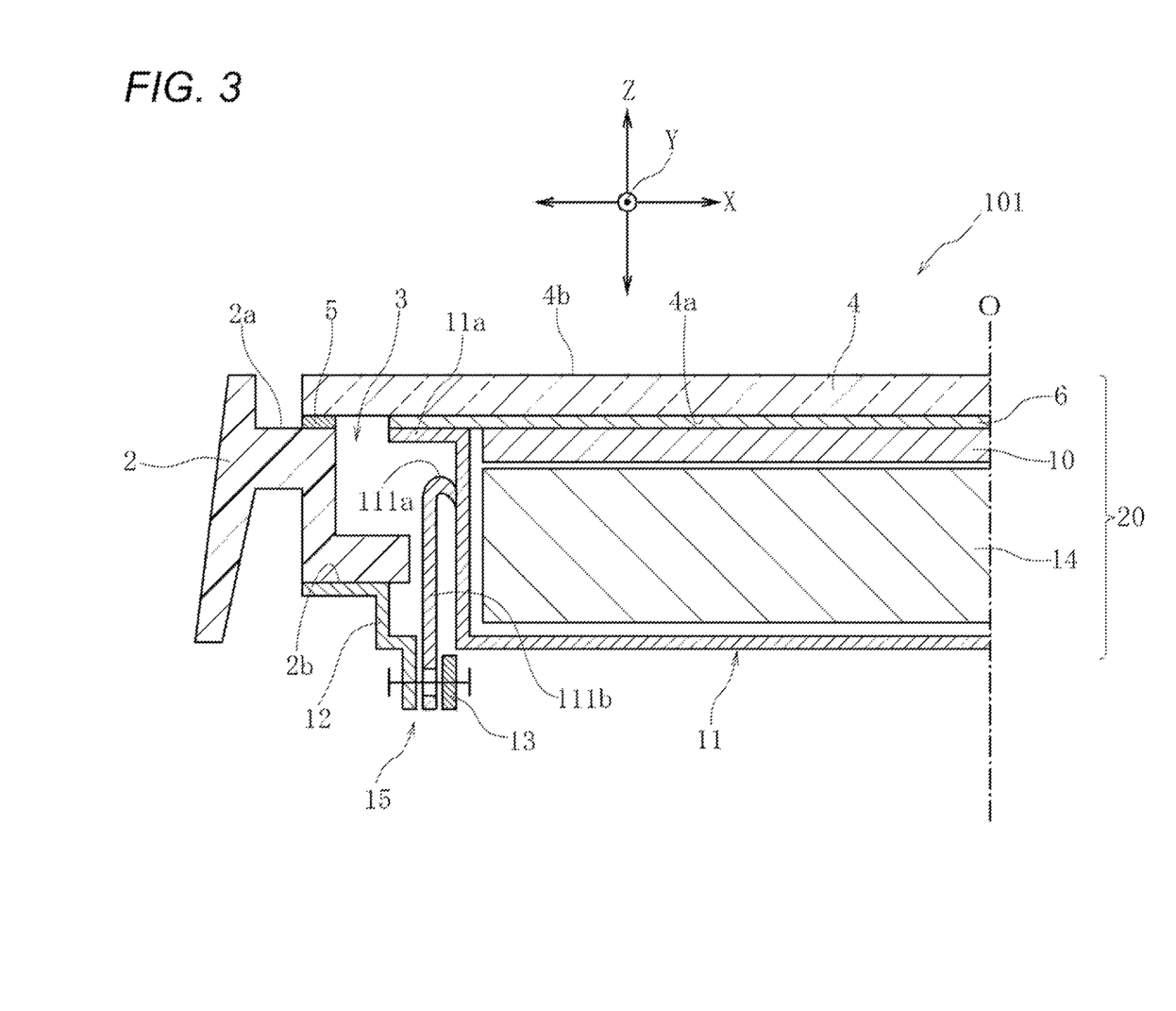
FIG. 3 is a cross sectional view illustrating a display device according to a second form of the present disclosure.
Figure 4:
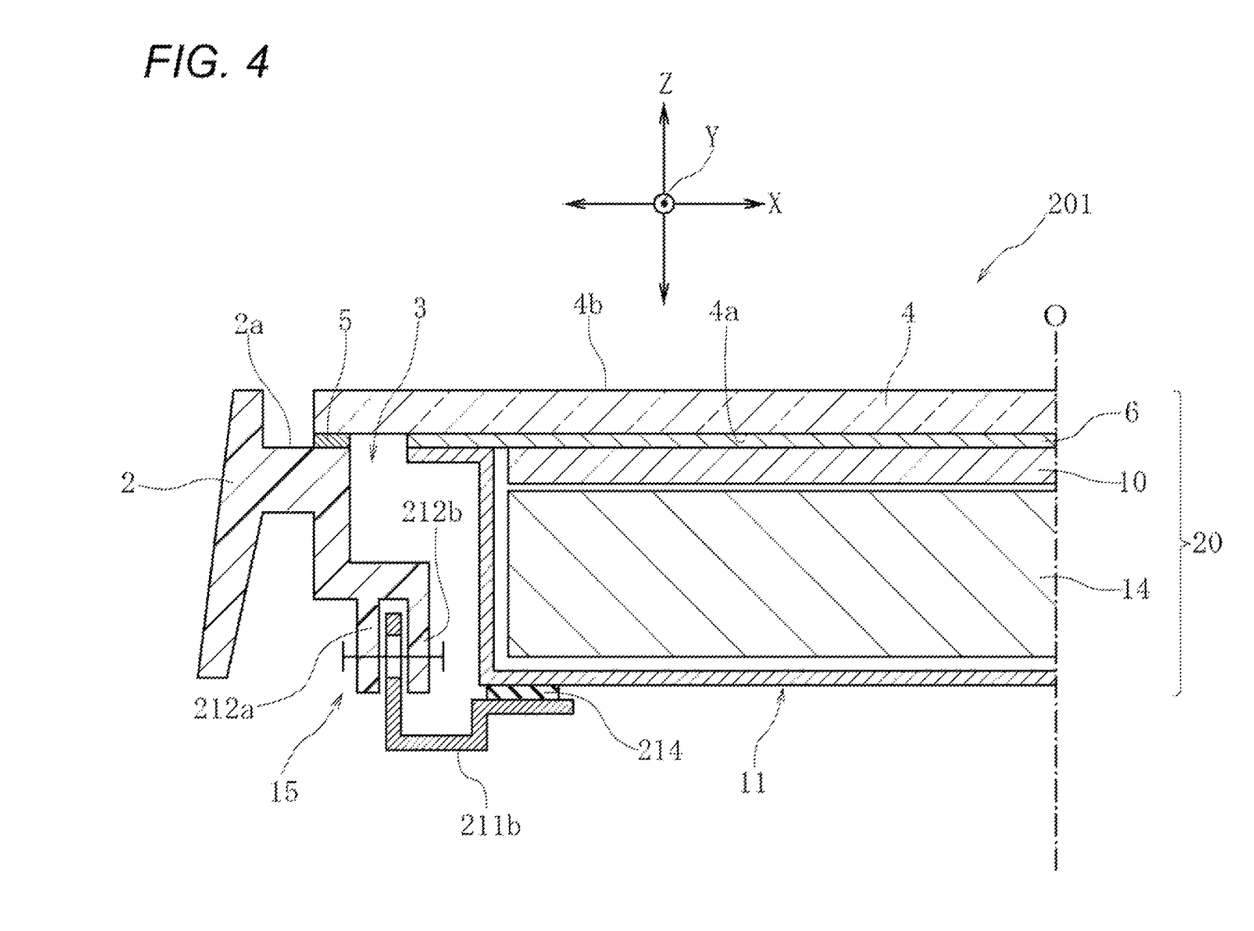
FIG. 4 is a cross sectional view of a display device according to a third form of the present disclosure.
Figure 5:
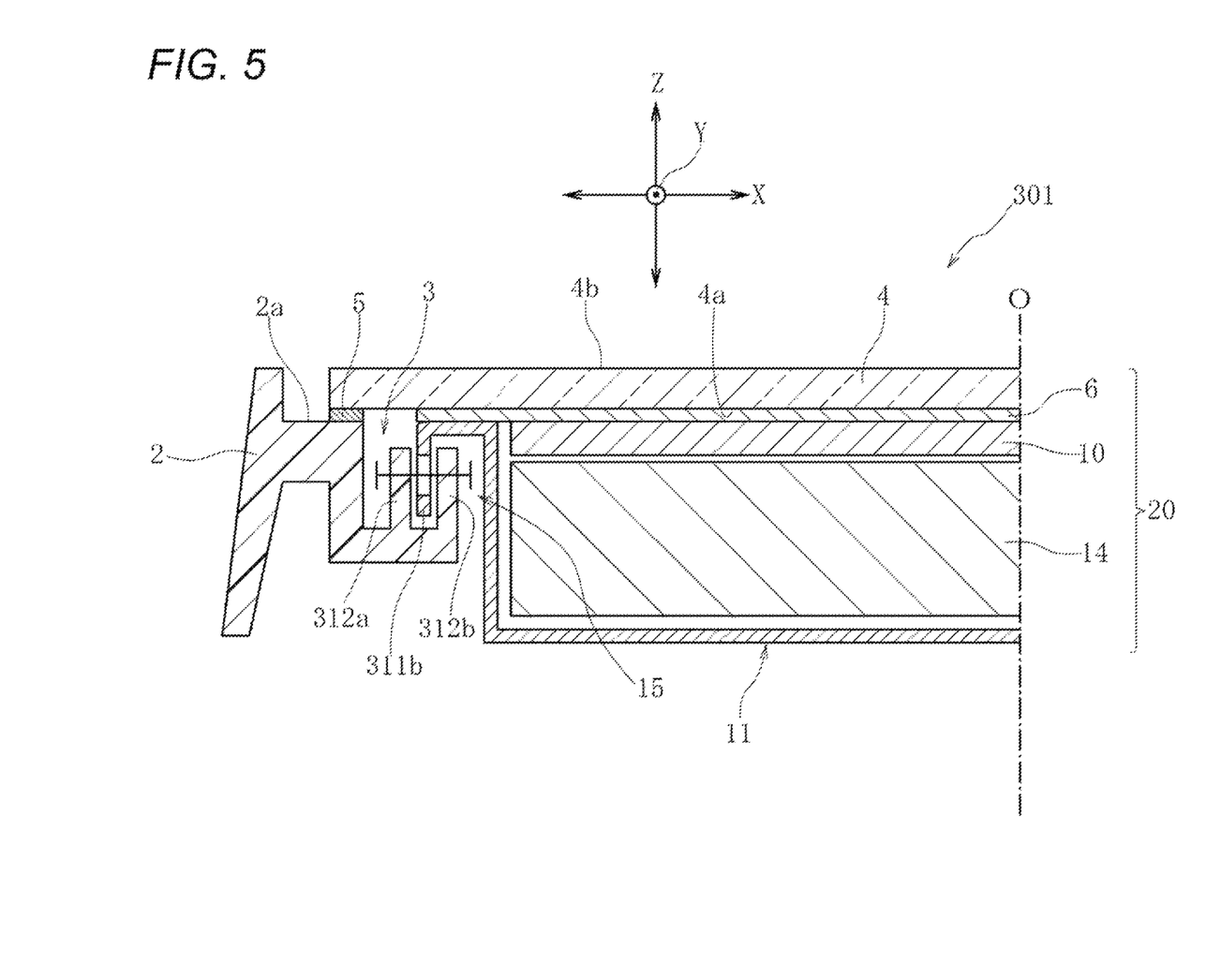
FIG. 5 is a cross sectional view of a display device according to a fourth form of the present disclosure.

In FIGS. 3 to 5, display devices according to other forms of the present disclosure are illustrated. In these forms, like references indicate parts exhibiting similar functions to those of the first embodiment, and redundant detailed description will not be provided. In addition, to each of the forms, any one of the fixing mechanisms of FIGS. 2A, 2B, and 2C may be applied.

In the display device 101 according to a second form illustrated in FIG. 3, a mounting piece 111b extending long from the side of the bracket 11 to the inside of the device is formed. The tip part of the mounting piece 111b is fixed to the holding member 12 through the fixing mechanism 15 (115, 215).

In the second form, the mounting piece 111b is formed by folding the side plate of the bracket 11 by 180° through a bending part 111a. Thus, even when fixing force due to the fixing mechanism 15 (115, 215) acts on the mounting piece 111b in the X direction, the force can be absorbed by elastic deformation of the bending part 111a and the mounting piece 111b, whereby force in the X direction is less likely to act on the bracket 11.

In a display device 201 according to a third form illustrated in FIG. 4, a mounting piece 211b is fixed to the bottom of the bracket 11 through an elastic member 214 such as rubber. However, the mounting piece 211b may be directly adhered and fixed to the bracket 11 without the elastic member 214 therebetween. The support 2 is formed with a pair of holding parts 212a and 212b in the rear part, and the tip part of the mounting piece 211b lies between the holding parts 212a and 212b. The mounting piece 211b and the support 2 are fixed through the fixing mechanism 15 (115, 215).

In the third form, the mounting piece 211b is attached to the bracket 11 through an elastic member 214. Thus, fixing force due to the fixing mechanism 15 (115, 215) can be relaxed by the elastic member 214.

In a display device 301 according to a fourth form illustrated in FIG. 5, the support 2 is integrally formed with holding parts 312a and 312b extending forward. A mounting piece 311b formed integrally with the bracket 11 lies between the holding parts 312a and 312b, and the mounting piece 311b and the support 2 are fixed through the fixing mechanism 15 (115, 215).

Figure 6:
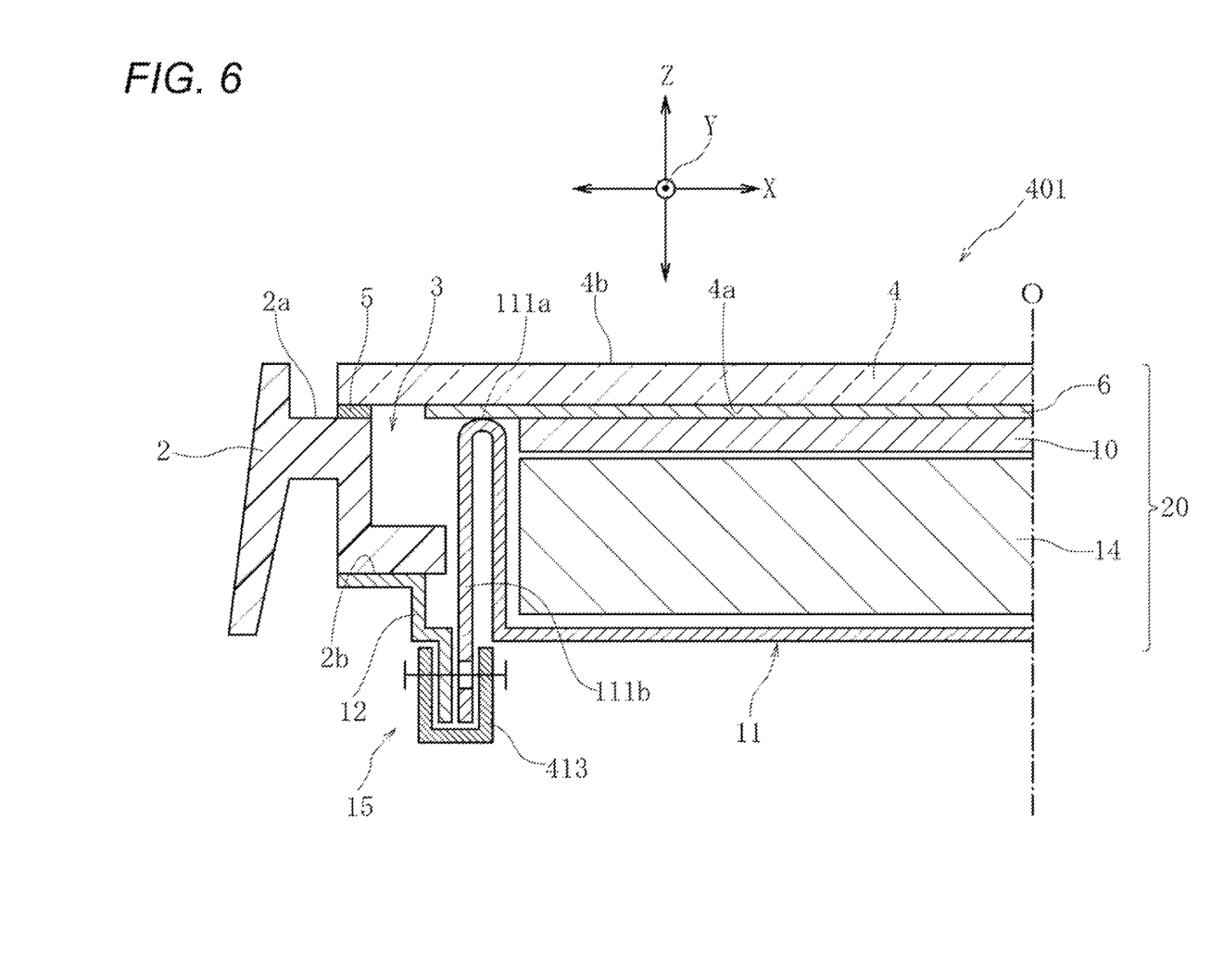
FIG. 6 is a cross sectional view of a display device according to a fifth form of the present disclosure.

In a display device 401 according to a fifth form illustrated in FIG. 6, the bracket 11 is formed with the mounting piece 111b folded at the bending part 111a similarly to FIG. 3. The holding member 12 and the mounting piece 111b are then clamped by a fixing piece 413, and the mounting piece 211b and the holding member 12 are fixed through the fixing mechanism 15 (115, 215). The fixing piece 413 may be formed from a deformable thin metal plate.

It is therefore intended that the foregoing detailed description be regarded as illustrative rather than limiting, and that it be understood that it is the following claims, including all equivalents, that are intended to define the spirit and scope of this invention.

What is claimed is:

1. A display device comprising:
    a support;
    a display window formed in the support;
    a light-transmissive front panel mounted on the display window; and
    a display cell positioned at an inner side of the front panel,
    wherein the display cell is adhered and fixed to an inner surface of the front panel, and the front panel and the display cell are held by a bracket to form a display body unit,
    wherein the front panel is fixed to the support, the display body unit is mounted on the support, and the bracket is fixed to the support by a fixing mechanism,
    wherein the fixing mechanism comprises a mounting portion extending in a vertical direction formed at the bracket, a holding member fixed to the support, and a mounting screw that fastens the mounting portion on the holding member, and
    wherein the bracket and the support are configured to have position adjustability in the vertical direction perpendicular to a surface of the front panel while the front panel is fixed to the support and the front panel is positioned upright in the display device.

2. The display device according to claim 1, wherein the display cell is adhered and fixed to an inner surface of the front panel with a touchpad therebetween.

3. The display device according to claim 1, wherein a back light is held by the bracket.

4. The display device according to claim 1, wherein the bracket is formed with a mounting portion extending in the vertical direction, the mounting piece is fixed to the support, and the mounting portion is elastically deformable in a direction along the surface of the front panel.

5. The display device according to claim 4, wherein in the fixing mechanism, a mounting hole is formed in the mounting portion, and the mounting portion is fixed to the support by a mounting screw having a diameter smaller than an inner diameter of the mounting hole.

6. The display device according to claim 4, wherein in the fixing mechanism, the mounting portion is formed with a mounting hole, and the mounting portion is fixed to the support by a rivet having a diameter smaller than the mounting hole.

7. The display device according to claim 4, wherein in the fixing mechanism, the mounting portion is fixed to the support by adhesive.

* * * * *